Nov. 15, 1949 B. M. THUN 2,488,042
SPRING SCALE
Filed Feb. 20, 1947

INVENTOR.
Bernard M. Thun
BY Lieber & Lieber
ATTORNEYS

Patented Nov. 15, 1949

2,488,042

UNITED STATES PATENT OFFICE 2,488,042

SPRING SCALE

Bernard M. Thun, Milwaukee, Wis.

Application February 20, 1947, Serial No. 729,714

3 Claims. (Cl. 265—63)

My present invention relates generally to improvements in weighing devices, and relates more particularly to improvements in the construction and operation of scales of the spring type.

A primary object of this invention is to provide an improved new and useful weighing scale which is simple, compact and durable in construction, and which is moreover highly efficient and accurate in operation.

Various types of portable weighing devices, commonly known as scales, have heretofore been proposed. The majority of these prior art portable scales have been of the spring type as distinguished from the balance type because of the greater practicability in obtaining a compact and unitary device. These portable scales have numerous diverse uses, one of the most frequent of which is for weighing game. Consequently, these devices are often carried in confined spaces in fishing tackle boxes, ammunition cases, and in pockets. They must be light in weight, small, reasonably accurate, sufficiently durable to withstand considerable abuse, adjustable, non-corrosive, inexpensive, and preferably with a minimum number of projections or the like which are apt to catch hooks and tear cloth, etc. While several of the spring scales heretofore proposed have enjoyed considerable commercial success, none of them possess all of these desirable qualities.

It is therefore a more specific object of my present invention to provide an improved portable weighing scale which embodies all of the desirable characteristics hereinabove set forth.

Another specific object of this invention is to provide an improved suspension type portable scale wherein the weight indicating mechanism is entirely housed within a protective casing at all times and wherein the article receiving hook may be conveniently covered when the scale is not in use so as to eliminate all projections.

Another specific object of the invention is to provide an improved portable scale of the spring type which may be readily adjusted by a novice without special tools, and which may be utilized for diverse purposes for determining weights with a high degree of accuracy.

Another specific object of my invention is to provide an improved weighing scale which is composed of relatively few simple parts, all of which may be formed of available materials and readily assembled.

A further specific object of my present invention is to provide an improved unitary portable weighing device which may be readily dismantled for inspection or repair, which is extremely compact and light, and wherein all parts are protected.

An additional specific object of the present invention is to provide an improved portable weighing scale which is durable in construction, neat and attractive in appearance, highly efficient in actual use, and which may be manufactured and sold in large quantities at moderate cost.

Still another specific object of the present invention is to provide an improved scale comprising, a housing provided with a transparent portion having calibrations associated therewith, and weight indicating mechanism confined within the housing and having means visible through the transparent portion of the housing and cooperating with the calibrations to indicate weights.

These and other specific objects and advantages of my improvement will be apparent from the following detailed description.

A clear conception of the several features constituting my present invention, and of the mode of constructing and of utilizing weighing scales embodying the improvements, may be had by referring to the drawings accompanying and forming a part of this specification wherein like reference characters designate the same or similar parts in the various views.

While the invention has been shown and described herein as being specifically embodied in a portable spring scale especially adapted for use in weighing game, it is not my desire or intention to thereby unnecessarily restrict the scope or utility of the improvement.

Figure 3:
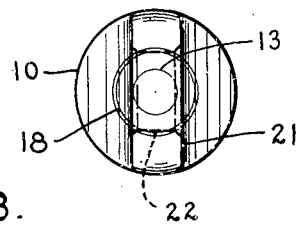
Fig. 3 is a top view of the scale of Fig. 1.
Figures 1, 2:
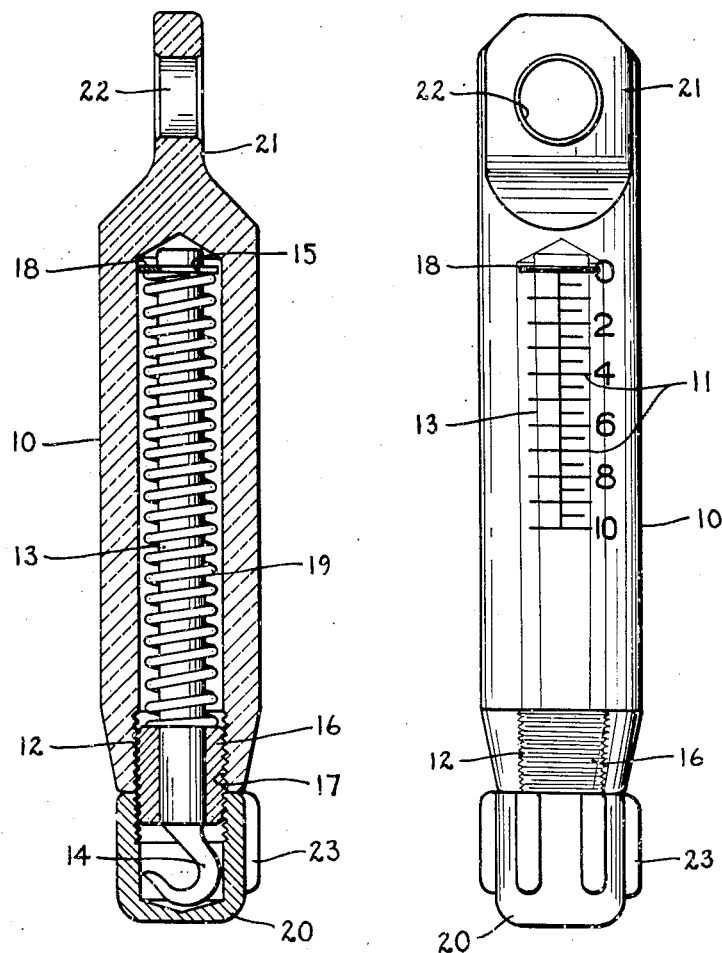
Fig. 1 is a central longitudinal vertical section through a typical improved weighing scale constructed in accordance with my invention.
Fig. 2 is a side elevation of the scale of Fig. 1.

Referring to the drawings, the typical improved weighing scale shown in Figs. 1 to 3 inclusive, comprises in general, an elongated tubular casing or housing 10 formed of transparent material such as plastic and having calibrations 11 on the face thereof, one end of the housing 10 being sealed and the other end being provided with internal screw threads 12; weight indicating mechanism including, a rod or bar 13 provided with a hook 14 at one end thereof and an annular groove 15 near the opposite end, a bushing 16 slidably embracing the rod 13 adjacent the hooked end thereof and having external screw threads 17 adapted for coaction with the screw threads 12 of the housing, a snap ring 18 forming the indicating marker or pointer receivable within the groove 15 and extending laterally therefrom to provide a flange, and a spring 19 of predetermined length and strength surrounding the rod 13 and interposed between the bushing 16 and ring 18; and an internally threaded cap 20 coacting with the threads 17 of the bushing 16 and adapted to abut against the extreme threaded end of the housing 10.

The sealed end of the housing 10 may be formed with a narrow portion 21 having an opening 22 therethrough for aiding in gripping or otherwise suspending the scale during use, and the scale may obviously be made of any desired size. The snap ring 18 should preferably be colored so as to be clearly visible through the transparent housing 10, thereby cooperating with the calibrations 11 to indicate weights, and the spring 19 should be of a length corresponding to the distance between the opposing faces of the bushing 16 and ring 18 and may be of a strength such as will weigh in ounces or in pounds or in fractions or multiples thereof, as desired. For use as a game scale, it is desirable to form the hook 14 so that it terminates in a point, as shown, to permit penetration of the skin of the game to be weighed; and the cap 20 is preferably provided with ribs 23 or the like to permit ready gripping during application and removal thereof. The rod 13 is guided during longitudinal movement thereof by the bushing 16 and by the ring 18, the periphery of which closely approaches the inner wall of the housing 10; and since the ring 18 substantially surrounds the rod 13, it is always visible and readable as a weight indicator from the calibrated side of the scale regardless of the rotation of the rod 13. The housing 10 may obviously be provided with more than one calibrated face 11, as desired; and the various parts may be formed of any suitable available material.

In actual use of the device shown in Figs. 1 to 3, the cap 20 is first removed in an obvious manner; and with the scale suspended vertically as shown, any necessary adjustment in the position of the indicating ring 18 may be effected by rotating the threaded bushing 16 relative to the housing 10, thereby raising or lowering the indicating ring 18 through coaction with the spring 19. After the device has been properly adjusted with the indicator 18 at "0" reading when viewed through the calibrated face of the transparent housing 10, the matter to be weighed is secured to the depending hook 14, causing the rod 13 to slide downwardly against the resistance of the spring 19 which becomes compressed between the bushing 16 and the ring 18. The ring 18 is obviously carried downwardly with the rod 13 and may be viewed through the calibrated face of the transparent housing 10 to determine the weight of the matter suspended from the hook 14.

From the foregoing detailed description, it is apparent that my present invention provides an improved weighing scale which is simple, compact and durable in construction, and which is moreover highly efficient and accurate in actual use. The improved device is composed of relatively few parts which may be readily molded or otherwise formed of available materials and quickly assembled in a simple manner for sale in large quantities at low cost. The improved weighing scales may be utilized for diverse purposes in the home as well as outdoors, and the weight indicating mechanisms are adequately protected at all times. By having the weight indicating mechanism, including the marker or indicator 18, housed within the transparent casing or shell 10, and with the hook 14, covered by the cap 20, all projections likely to catch fishhooks, pockets and the like are eliminated and the various parts are likewise protected from corrosion. The scale may be readily adjusted as well as dismantled and/or assembled by a novice without special tools, and the improved portable devices may be made extremely small in size and light in weight by virtue of my improvements without interfering with or sacrificing accuracy. Weighing units manufactured in accordance with my invention have in fact proven highly successful and extremely efficient in actual commercial use and have met with widespread acceptance.

It should be understood that it is not desired to limit this invention to the exact details of construction or to the precise mode of use herein shown and described, for various modifications within the scope of the appended claims may occur to persons skilled in the art to which this invention pertains.

I claim:

1. A weighing device comprising, an elongated transparent tubular housing having a relatively large bore and relatively long calibrations on the housing exterior extending across the bore, said housing bore being sealed at one end and having its opposite end provided with a removable bushing, a rod-like member extending longitudinally within said housing bore and having sliding coaction with said bushing, a weight indicating flange of approximately the same diameter as said bore associated with said member within said bore, said flange being visible through the transparent housing and cooperating with said calibrations to indicate weights, a helical compression spring of predetermined length and strength surrounding said member and cooperating with said bushing and said weight indicating flange to return said indicator to a predetermined position, and means carried by the outer end of said member and extending outwardly of said housing beyond said bushing for receiving material to be weighed.

2. A weighing device comprising, an elongated transparent tubular housing having a relatively large bore and a series of calibrations on the housing exterior extending transversely of said bore, said housing bore being sealed at one end and having its opposite end provided with a removable bushing, a rod-like member extending longitudinally within said housing bore and having sliding coaction with said bushing, an annular weight indicating flange of approximately the same diameter as said bore associated with said member within said bore, said flange being rotatable with said member during sliding movement thereof with the peripheral edge of said flange being constantly visible through the transparent housing and constantly cooperable with said calibrations to indicate weights, said bushing cooperating with said flange to guide said member during sliding movement thereof, a helical compression spring surrounding said member and interposed between said bushing and said flange, and means carried by the outer end of said member and extending outwardly of said housing beyond said bushing for receiving material to be weighed.

3. A weighing device comprising, an elongated transparent tubular housing having a central bore and calibrations on the face thereof, said housing bore being sealed at one end and having its opposite end provided with an adjustable bushing, a rod-like member normally confined within said housing bore and having sliding coaction with said bushing, a weight indicating flange associated with said member within said bore and visible through the transparent housing and cooperating with said calibrations to indicate weights, a helical compression spring surrounding said member and interposed between said bushing and said flange, means carried by the outer end of said member and extending outwardly of said housing beyond said bushing for receiving material to be weighed, and a cap cooperable with said bushing and the adjacent end of said housing to lock said bushing and enclose said material receiving means.

BERNARD M. THUN.

REFERENCES CITED

The following references are of record in the file of this patent:

UNITED STATES PATENTS

| Number | Name | Date |
|---|---|---|
| 735,003 | Ward | July 28, 1903 |
| 996,358 | Oleson | June 27, 1911 |
| 1,141,562 | Law | June 1, 1915 |
| 1,173,117 | Obermann | Feb. 22, 1916 |
| 1,234,430 | Wetzel | July 24, 1917 |
| 2,343,582 | Rist | Mar. 7, 1944 |